United States Patent [19]

Katsuyama

[11] Patent Number: 4,541,022

[45] Date of Patent: Sep. 10, 1985

[54] DEVICES FOR DISPLAYING ADDRESSES ON A RECORD MEDIUM

[75] Inventor: Akira Katsuyama, Yokohama, Japan

[73] Assignee: Sony Corporation, Tokyo, Japan

[21] Appl. No.: 503,307

[22] Filed: Jun. 10, 1983

[30] Foreign Application Priority Data

Jun. 21, 1982 [JP] Japan .................................. 57-106526

[51] Int. Cl.³ ............................................. G11B 15/52
[52] U.S. Cl. .................................... 360/72.2; 360/48; 369/47
[58] Field of Search ................... 360/48, 72.2; 369/47; 365/230

[56] References Cited

U.S. PATENT DOCUMENTS 4,485,412 11/1984 Sugiyama et al. ................. 360/72.2

Primary Examiner—Terrell W. Fears
Attorney, Agent, or Firm—Lewis H. Eslinger; Alvin Sinderbrand

[57] ABSTRACT

A device for displaying addresses on a record medium which has program information and address information recorded thereon to form a plurality of program information recorded portions each containing at the beginning part thereof a pause division where no program information is recorded, the device comprises detecting means for detecting the pause division by discriminating the contents of specific address information which is contained in reproduced address information obtained from the record medium, means for producing reformed address information composed of modified time address information obtained by modifying time address information contained in the reproduced address information and positional address information contained in the reproduced address information, and display means for making a visual display of the contents of the reformed address information with a minus mark when the pause division is detected by the detecting means and making a visual display of the contents of the reproduced address information when the pause division is not detected by the detecting means.

6 Claims, 10 Drawing Figures

FIG. 3
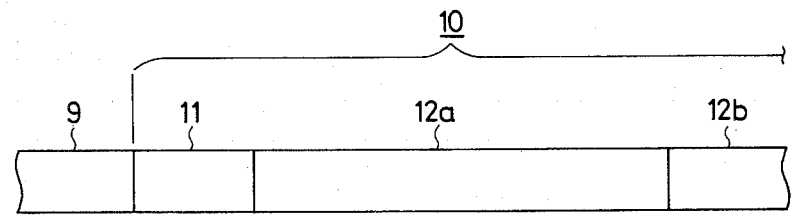
FIG. 4
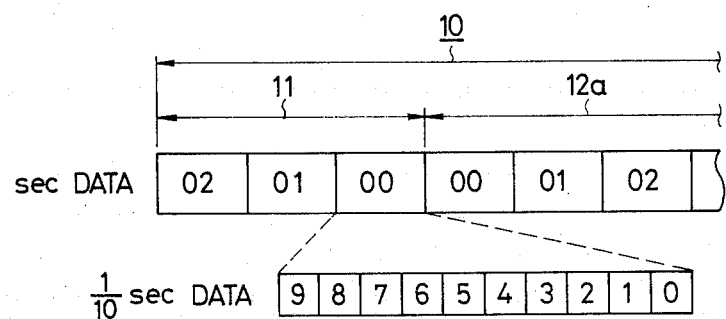
FIG. 5

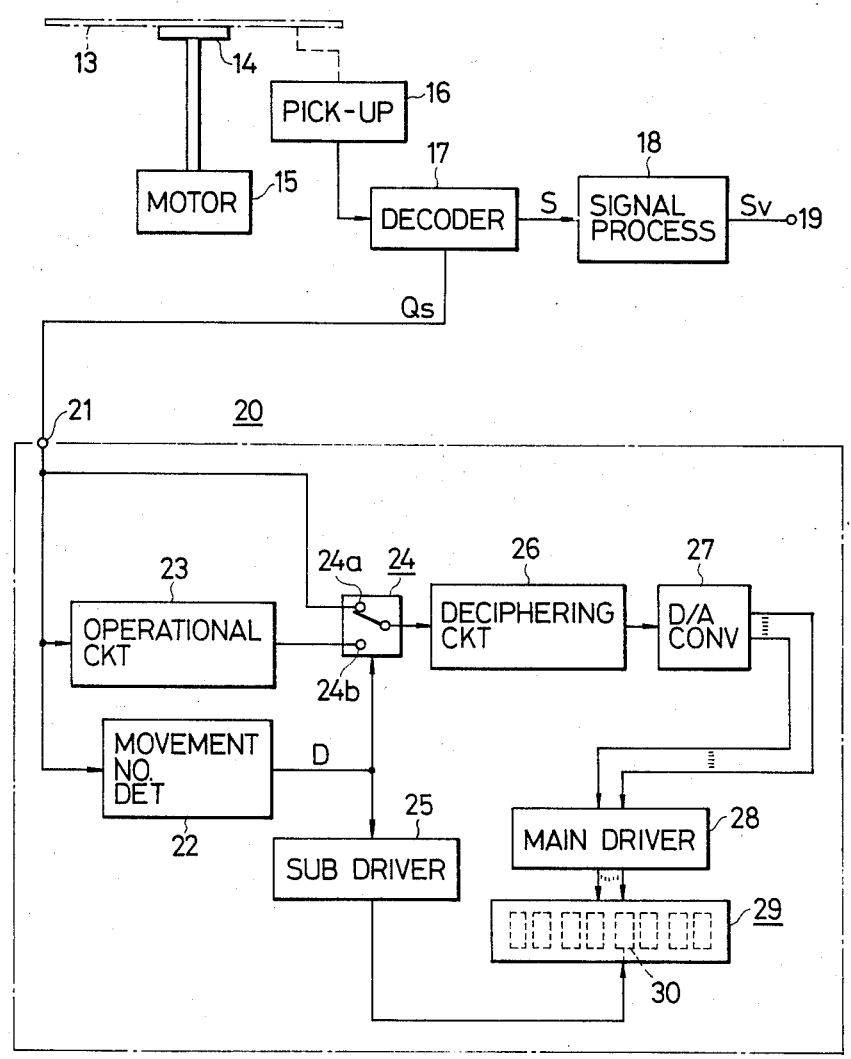

FIG. 7A  FIG. 7B
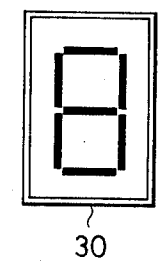
30
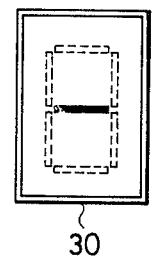
30
FIG. 8A  FIG. 8B
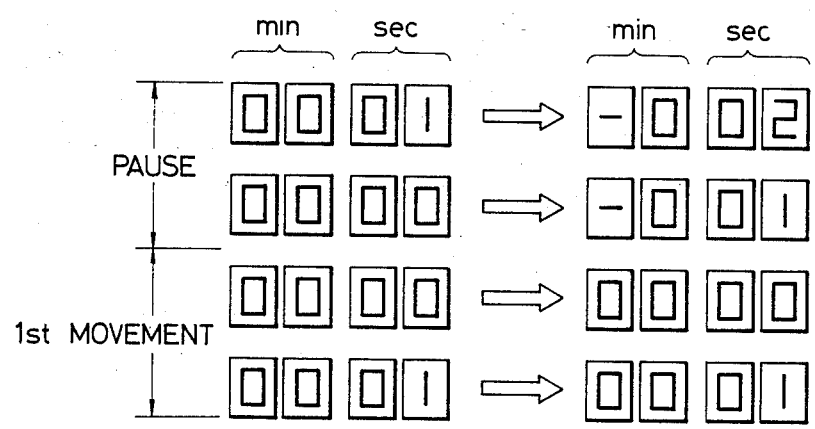

DEVICES FOR DISPLAYING ADDRESSES ON A RECORD MEDIUM

BACKGROUND OF THE INVENTION

This invention relates generally to devices for displaying addresses on a record medium, which is suitable for use in an apparatus for reproducing a signal from a record disc, such as a digital audio disc player, and more particularly, is directed to an address displaying device which can display visually the contents of address information obtained from a record medium in an improved manner.

A digital audio disc, which is a rotatable disc having a spiral record track in which a digital audio signal is recorded as program information together with address information, has been proposed to be loaded on a disc player to obtain a reproduced audio signal. Digital signals which are to be recorded on the digital audio disc are formed, for example, to have a data format containing successive frame segments. The duration of each frame segment is 136.1 μsec and therefore the repetition frequency of one frame segment is 7.35 kHz, for example, as shown in FIG. 1. In FIG. 1, the frame segments are arranged vertically for convenience' sake. Each frame segment comprises a portion 1 containing a frame synchronous information A, a subcoding portion 2 and a data portion 3. The subcoding portion 2 contains address information forming a unit whithin each block segment which comprises 98 frame segments. The duration of each block segment is 13.3 msec and threrfore the repetition frequency of one block segment is 75 Hz. Each subcoding portion 2 is divided into eight channels including channels P to W, and the subcoding portions 2 in the first and second frame segments at the beginning of each block segment are provided through the channels P to W therein with block synchronous information B and C, respectively, while each of the subcoding portions 2 in the remaining 96 frame segments forming the block segment in cooperation with the first and second frame segments is provided at the channel Q therein with address information accompanying with program information in the data portion 3.

FIG. 2 shows one example of a data format of the channel Q. The channel Q in this example includes the block synchronous information B and C, a portion 4 representing a music number m as an example of a number for each program information section, a portion 5 representing a movement number n as an example of a number for each part of one program information section, and portions 6, 7 and 8 containing time address information representing running time within each part of one program information section, which is expressed in minutes, seconds and deciseconds. These synchronous information and address information in the channel Q are inserted dispersedly into the frame segments forming one block segment in such a manner that each one bit thereof is contained in each of the frame segments, as shown in FIG. 1. Each of the portion 4 representing the music number m, the portion 5 representing the movement number n and the portions 6 and 7 containing the time address information representing the time expressed in minutes and the time address information representing the time expressed in seconds, respectively, is formed with eight bits, and the portion 8 containing the time address information representing the time expressed in deciseconds is formed with four bits.

As mentioned above, the address information forms one unit thereof within each block segment. Therefore, a unit of address information is obtained at every block segment, that is, at every 1/75 = 13.3 msec, in reproduction of signals from the digital audio disc. In such a case, the minimum piece of the address information which is the time address information representing the time expressed in deciseconds corresponds to 1/10 sec, and since this minimum piece of the address information is 7.5 times as long as the duration of the block segment, the same unit of address information is obtained from each successive seven to eight block segments.

Since the address information is recorded on the digital audio disc to accompany with the program information sections, it is possible to detect the location on the digital audio disc from which the program information and address information are read out by a pick-up device by deciphering the address information obtained from the pick-up device when an audio signal is reproduced from the digital audio disc by a disc player. Accordingly, in reproduction of the audio signal from the digital audio disc, if the contents of the address information obtained from the pick-up device is visually displayed by a display device, it is possible to easily know the location on the digital audio disc from which the program information is read out by the pick-up device to reproduce the audio signal.

FIG. 3 shows a part of a recording format of the program information recorded on the digital audio disc in which a boundary between two successive program information sections is included. In FIG. 3, a first program information recorded portion 9 where, for example, a first music information is recorded as one program information section and a second program information recorded portion 10 where, for example, a second music information is recorded as the next program information section are provided. A plurality of program information recorded portions in each of which a music information is recorded as a program information section, such as the first and second program information recorded portions 9 and 10, are formed successively in the spiral record track on the digital audio disc, and each of the program information recorded portions comprises a pause division 11 where no program information is actually recorded and first, second, —movement divisions 12a, 12b, —in each of which each movement information contained in the recorded music information is actually recorded together with the address information.

To cite the second program information recorded portion 10 by way of example for explaining the divisions in each program information recorded portion, in the second program information recorded portion 10, the pause division 11 where no program information is recorded is provided at the beginning end and the first movement division 12a, the second movement division 12b, —in which the first movement information, the second movement information, —in the second music information are recorded, respectively, are provided in succession to follow the pause division 11 as far as the terminating end to which the next program information recorded portion follows. Each program information section such as the music is thus recorded with a predetermined recording format.

On the other hand, the address information accompanying with the program information is recorded through the whole divisions in each program information recorded portion. For example, positional address information representing the aforementioned music number m and movement number n and the time address information representing the aforementioned running time expressed in minutes, seconds and deciseconds, which form each unit of the address information, are continuously recorded with predetermined data as information indicating the position of each music as a program information section. That is, the address information is recorded also in the pause division 11 in each program information recorded portion.

Next, the time address information representing the time expressed in seconds in the pause division 11 and the first movement division 12a following to the pause division 11 will be explained with reference to FIG. 4. The time address information representing the time expressed in seconds recorded in the pause division 11 contains data reducing toward the first movement division 12a. That is, assuming that the reproducing time for the pause division 11 is approximately three seconds in reproducing the audio signal from the digital audio disc, the data of the time address information representing the time expressed in seconds recorded in the pause division 11 are arranged to vary in turn to be, for example, 0 2 → 0 1 → 0 0 along the direction for reading the record track, as shown in FIG. 4. On the other hand, the data of the time address information representing the time expressed in seconds recorded in the first movement division 12a are arranged to take 0 0 at the beginning portion of the first movement division 12a corresponding to the first one second and then increase every one second so as to vary to be 0 0 → 0 1 → 0 2 —along the direction for reading the record track, as shown also in FIG. 4. In this case, the data of the time address information representing the time expressed in seconds are arranged to take 0 0 at both of the end portion of the pause division 11 corresponding to the last one second and the beginning portion of the first movement division 12a corresponding to the first one second. This results from that the time address information representing the time expressed in deciseconds is recorded together with the time address information representing the time expressed in seconds as shown in FIG. 4 and the data of the time address information representing the time expressed in seconds are arranged to take 0 0 at the portion of each division corresponding to the time less than one second. Incidentally, the positional address information representing the music number m and the movement number n with the respective data is recorded in both of the pause division 11 and the first movement division 12a.

FIG. 5 shows the variations at every one second of the data of the time address information which is recorded in the pause division 11 and the first movement division 12a in the second program information recorded portion 10 in such a manner as mentioned above. In FIG. 5, the data of the time address information representing the time expressed in seconds, which are surrounded by a dot-dash line, vary to be 0 2 → 0 1 → 0 0 → 0 0 → 0 1 → 0 2. That is, the data of the time address information representing the time expressed in seconds take 0 0 twice repeatedly at the boundary area between the pause division 11 and the first movement division 12a. Accordingly, when the address information recorded at such boundary area is reproduced by the disc player and the contents of the reproduced address information are visually displayed by the display device provided in the disc player, the time display resulted from the data of the time address information representing the time expressed in seconds shown 0 0 continuously during two seconds. This results in the disadvantage that the time display is performed quite unnaturally. Further, when the time display shows 0 1 or 0 2 in accordance with the data of the time address information representing the time expressed in seconds, a person who watches the time display at that time can not discriminate whether such data of the time address information representing the time expressed in seconds as causing the time display to show 0 1 or 0 2 are obtained from the pause division 11 or the first movement civision 12a, and this is very inconvenient for the person who watches the time display.

As apparent from FIG. 5, the data of the positional address information representing the movement number n, which are surrounded by a double dot-dash line in FIG. 5, are arranged to take 0 0 in the pause division 11.

OBJECTS AND SUMMARY OF THE INVENTION

It is an object of the present invention to provide a device for displaying addresses on a record medium, which can avoid the above described disadvantages encountered with the prior art in the case of use in a disc player for a digital audio disc.

Another object of the present invention is to provide a device for displaying addresses on a record medium having program information and address information containing time address information recorded thereon with a predetermined recording format, which can display visually in an intelligible manner the contents of the time address information when the program information and address information are read from the record medium.

A further object of the present invention is to provide a device for displaying addresses on a record medium which has program information and address information containing time address information recorded thereon to form a plurality of program information recorded portions each containing at the beginning part thereof a pause division where no program information is recorded, which modifies the time address information reproduced from the pause division so as to obtain an intelligible time address display of the contents of the time address information reproduced from the pause division when the program information and address information are read from the record medium.

According to an aspect of the present invention, there is provided a device for displaying addresses on a record medium which has program information and address information recorded thereon to form a plurality of program information recorded portions each containing at the beginning part thereof a pause division where no program information is recorded, the device comprising an information discriminating circuit for discriminating the contents of specific address information which is contained in reproduced address information obtained from the record medium and with which the pause division can be detected in order to detect the pause division, an address information reforming circuit for modifying time address information contained in the reproduced address information and producing reformed address information composed of the modified time address information and positional address information contained in the reproduced address information, display means for displaying selectively either the contents of the reproduced address information or the contents of the reformed address information in the form including a time display, and control means operative, in response to the output from the information discriminating circuit, to cause the display means to have thereon the display of the contents of the reformed address information with a minus mark added to the time display therein when the pause division is detected by the information discriminating circuit and to cause the display means to have thereon the display of the contents of the reproduced address information when the pause division is not detected by the information discriminating circuit.

The above, and other objects, features and advantages of the present invention will become apparent from the following detailed description thereof taken in conjunction with the accompanying drawings.

BRIEF DESCRIPTION OF THE DRAWINGS

FIG. 3 is an illustration showing a part of one example of a recording format for program information recorded on a digital audio disc;

FIGS. 4 and 5 are illustrations used for explaining address information recorded in a pause division and the vicinity thereof in each program information recorded portion in a record track on a digital audio disc;

FIG. 6 is a block diagram showing an embodiment of device for displaying addresses on a record medium according to the present invention, together with a part of a disc player employing the embodiment;

FIGS. 7A and 7B are illustrations showing an example of a displaying element used in a display device in the embodiment shown in FIG. 6; and FIGS. 8A and 8B are illustrations showing an example of time display on a display device in the conventional address displaying system and an example of time display on a display device employed in the embodiment shown in FIG. 6, respectively.

DESCRIPTION OF THE PREFERRED EMBODIMENT

Figure 1:
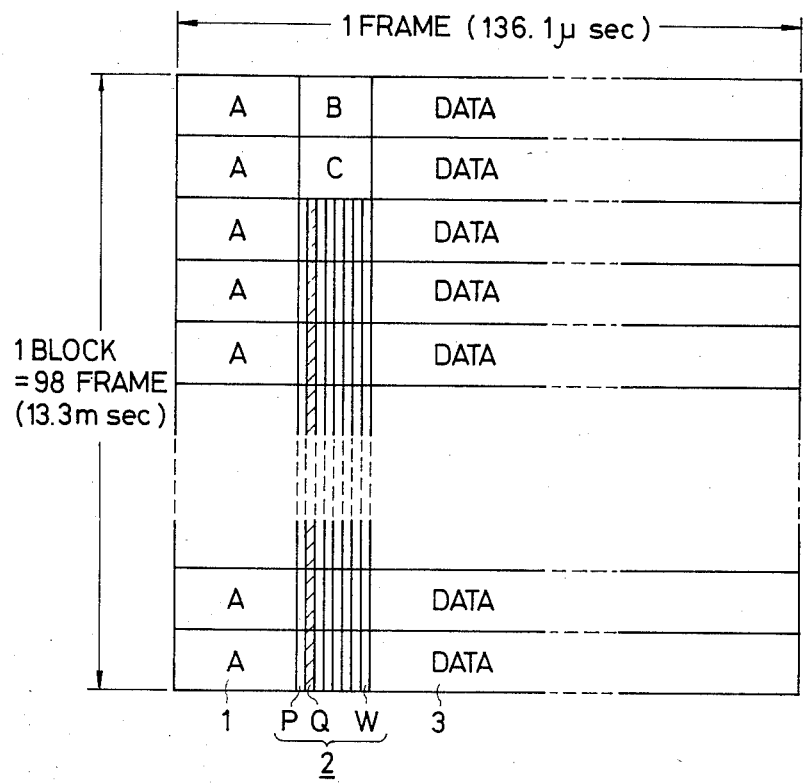
FIG. 1 is an illustration showing an example of a data format for digital signals recorded on a digital audio disc.
Figure 2:
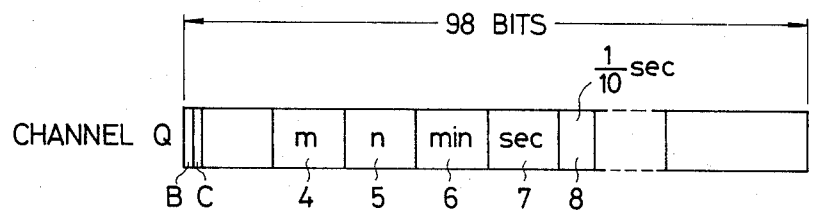
FIG. 2 is an illustration showing an example of a data format of channel Q contained in the format shown in FIG. 1.

FIG. 6 shows an embodiment of device for displaying addresses on a record medium according to the present invention, which is applied to a disc player. Referring to FIG. 6, a disc 13 is such a digital audio disc as aforementioned on which program information containing a plurality of sections each representing music is recorded together with address information accompanying the respective program information sections in a spiral record track thereon with a predetermined recording format. The disc 13 is loaded on a disc supporting portion 14 of the disc player which employs an example of the device for displaying the addresses on a record medium according to the present invention and rotated at a predetermined rotational speed by a disc rotating motor 15. The program information and address information recorded on the disc 13 are read by a pick-up device 16. The output end of the pick-up device 16 is connected to the input end of a decoder 17 and one of the output ends of the decoder 17 is connected to the input end of a signal processing circuit 18 so as to supply a reproduced program information S to the latter. The output end of the signal processing circuit 18 is connected to an audio output terminal 19 from which a reproduced audio signal $S_v$ is derived.

The other of the output ends is connected to an input terminal 21 of a circuit block 20 which constitutes the example of the device for displaying addresses on a record medium according to the present invention. The input terminal 21 is coupled with the input end of a movement number detecting circuit 22, the input end of an operational circuit 23 and a fixed contact 24a of a switch 24.

The movement number detecting circuit 22 is provided for discriminating the data of the positional address information which represents such a movement number n as aforementioned and is contained in reproduced address information Qs obtained from the decoder 17, and for producing a discrimination output D therefrom when the data discriminated thereby take 0 0. The operational circuit 23 which is supplied with the reproduced address information Qs obtained from the decoder 17 is provided for sending the positional address information representing such a music number m as aforementioned and the movement number n and contained in the reproduced address information Qs to the output end thereof as it is and also sending new time address information which is produced therein to represent a time which is obtained by adding one second to the time represented by the time address information contained in the reproduced address information Qs to the output end thereof. Accordingly, the operational circuit 23 constitutes an address information reforming circuit.

The output end of the operational circuit 23 is connected to a second fixed contact 24b of the switch 24. The output end of the movement number detecting circuit 22 is connected to the control terminal of the switch 24 and also to the input end of a subdriving circuit 25. The movable contact of the switch 24 is connected to the input end of a deciphering circuit 26 which is provided for producing output data in accordance with the data of the address information supplied to the input end thereof. The output end of the deciphering circuit 26 is connected to the input end of a digital to analog converter 27 having the output end thereof connected to the input end of a main driving circuit 28. The output end of the main driving circuit 28 is connected to one of the input ends of a display device 29 which provides a visual display thereon, and the output end of the subdriving circuit 25 is connected to the other of the input ends of the display device 29 in order to drive a specific displaying element 30 in the display device 29.

Now, the operation of the embodiment constructed as described above will be explained hereinafter.

The digital signal containing the program information and the address information, which is read from the disc 13 by the pick-up device 16, is supplied to the decoder 17. The reproduced program information S is obtained from one of the output ends of the decoder 17 and supplied to the signal processing circuit 18, so that the reproduced audio signal Sv is obtained in accordance with the reproduced program information S in the signal processing circuit 18 and derived from the audio output terminal 19.

On the other hand, the reproduced address information Qs is obtained from the other of the output ends of the decoder 17. The reproduced address information Qs thus obtained is the information representing the location on the disc 13 from which the program information is read by the pick-up device, and further the reproduced address information Qs is the information contained in the channel Q in such a data format as aforementioned and therefore includes the positional address information representing the music number m and the movement number n and the time address information representing the running time within each movement division expressed in minutes, seconds and deciseconds. The reproduced address information Qs is supplied through the first fixed contact 24a and the movable contact of the switch 24 to the deciphering circuit 26 when the program information and the address information are read by the pick-up device 16 from the movement divisions in each program information recorded portion in the record track on the disc 13. The reproduced address information Qs is deciphered at the deciphering circuit 27 and the data of the positional address information and the time address information obtained in consequence of the decipherment at the deciphering circuit 26 are supplied to the digital to analog converter 27. From the digital to analog converter 27, an analog output corresponding to the data from the decipharing circuit 26 is obtained and supplied to the main driving circuit 28. The display device 29 is drived by the main driving circuit 28 in response to the analog output from the digital to analog converter 27 and the contents of the reproduced address information Qs are visually displayed on the display device 29 in the form of disposition of the music number m, the movement number n and the time expressed in minutes, seconds, and deciseconds.

In the pause portion in each program information recorded portion, the data of the positional address information representing the movement number n take 0 0 as shown in FIG. 5 wherein these data are surrounded by the double dot-dash line. Consequently, when the address information is read by the pick-up device 16 from the pause division in each program information recorded portion in the record track on the disc 13, the reproduced positional address information representing the movement number n having the data taking 0 0, which is contained in the reprocued address information Qs from the decoder 17, is supplied to the movement number detecting circuit 22. On this occasion, the movement number detecting circuit 22 detects that the data of the reproduced positional address information representing the movement number n are taking 0 0 and produces the descrimination output D. This discrimination output D is supplied to the control terminal of the switch 24 so as to turn the movable contact of the switch 24 to be connected to the second fixed contact 24b of the switch 24, so that the situation in which the reproduced address information Qs from the decoder 17 is supplied through the switch 24 to the deciphering circuit 26 is changed into another situation in which the reformed address information obtained from the operational circuit 23 is supplied through the switch 24 to the deciphering circuit 26. The reformed address information from the operational circuit 23 comprises the positional address information contained in the reproduced address information Qs and the newly produced time address information representing the time which is obtained by adding one second to the time represented by the time address information contained in the reproduced address information Qs. As a result of this, the contents of the reformed address information which are displayed on the display device 29 in this case include the time which is more by one second than the time included in the contents of the reproduced address information Qs obtained at that time.

The discrimination output D from the movement number detecting circuit 22 is also supplied to the subdriving circuit 25. With the discrimination output D, the subdriving circuit 25 drives the specific displaying element 30, which may be a displaying element for displaying the contents of the time address information representing the time expressed in minutes, in the display device 29 in a predetermined manner so as to cause the specific displaying element 30 to display a mark of minus thereon. This minus mark is provided to indicate clearly that the reproduced address information is obtained from the pause division. In case that a displaying element which has seven light emitting segments arranged so as to form of a Chainese character " " as shown in FIG. 7A is used as each of the displaying elements including the specific displaying element 30 in the display device 29, the display of the minus mark is made by causing a central light emitting segment of the specific displaying element 30 to be luminous, as shown in FIG. 7B.

When the reading by the pick-up 16 at the pause division has been finished the pick-up device 16 commences and continue to read the program information section, that is, the music information and the address information from the movement divisions following the pause division in the program information recorded portion, and therefore the reproduced address information Qs containing the positional address information representing the movement number n which has the data other than 0 0 is supplied to the movement number detecting circuit 22. Consequently, the discrimination output D is not obtained from the movement number detecting circuit 22, so that the movable contact of the switch 24 is turned again to be connected to the first fixed contact 24a and further the subdriving circuit 25 ceases to be operative. As a result of this, the contents of the reproduced address information Qs are displayed by the display device 29 as they are.

With such operation as described above, when the reading by the pick-up device 16 is performed at the pause division in each program information recorded portion in the record track on the disc 13, the time display on the display device 29 is advanced by one second and added thereto the minus mark. Accordingly, such intelligible and clear time display as shown in FIG. 8B can be obtained on the display device 29 employed in the embodiment when the address information and the program information are read by the pick-up device 16 from the boundary area between the pause division and the first movement division in each program information recorded portion in the record track on the disc 13, while such unintelligible time display as shown in FIG. 8A wouled be made on the display device in the conventional address displaying system in the same situation.

As for the detection of the pause division, if any other address information with which the pause division can be detected is recorded on the disc 13 in addition to the positional address information representing the movement number n, the reproduced output of such other address information may be utilized to detect the pause division.

What is claimed is:

1. A device for displaying time indications corresponding to address information recorded with program information in a plurality of successive recorded portions on a record medium, each of said recorded portions containing, at a beginning part thereof, a pause division where no program information is recorded, comprising;

means for obtaining from said record medium successive reproduced address information composed of positional information and time information, information discriminating means for detecting said pause division by discriminating said reproduced address information, and for producing an output indicative of when said pause division is detected, address information reforming means for modifying said time information contained in said reproduced address information and for producing reformed address information composed of modified time address information and said positional information contained in said reproduced address information, display means for displaying time indications selectively based on either said reformed address information or said reproduced address information, and control means responsive to said output from said information discriminating means for controlling said display means to display thereon said time indication based on the reformed address information with a distinguishing mark added thereto when said pause division is detected by said information discriminating means, and to display thereon said time indication based on the reproduced address information when said pause division is not detected by said information discriminating means.

2. A device according to claim 1, wherein said address information reforming means modifies said time information contained in said reproduced address information so that a first time indication, produced from reproduced address information obtained when said pause division is detected, and a next successive time indication, produced from the next successive reproduced address information obtained when said pause division is not detected, together form a continuous time sequence.

3. A device according to claim 1, wherein said control means includes switch means controlled by said output from said information discriminating means to extract a selected one of said reformed address information from said address information reforming means and said reproduced address information, first operating means coupled with said switch means for operating said display means in response to said selected one of said reformed address information and said reproduced address information, and second operating means coupled with said information discriminating means for operating said display means in response to said output of said information discriminating means so as to display said distinguishing mark thereon.

4. A device according to claim 3, wherein said first operating means includes deciphering means for deciphering said selected one of said reformed address information and reproduced address information to produce digital data corresponding thereto, digital to analog converter means for converting said digital data into an analog output, and means for supplying said analog output from said digital to analog converter means to said display means.

5. A device according to claim 1, wherein said distinguishing mark is a minus sign mark.

6. A device according to claim 1, wherein said information discriminating means responds to a predetermined value of said time information in the reproduced address information for detecting said pause division.

* * * * *